April 18, 1939.　　　D. D. SMITH　　　2,155,336
FILLING MACHINE
Filed April 4, 1938　　　5 Sheets-Sheet 1
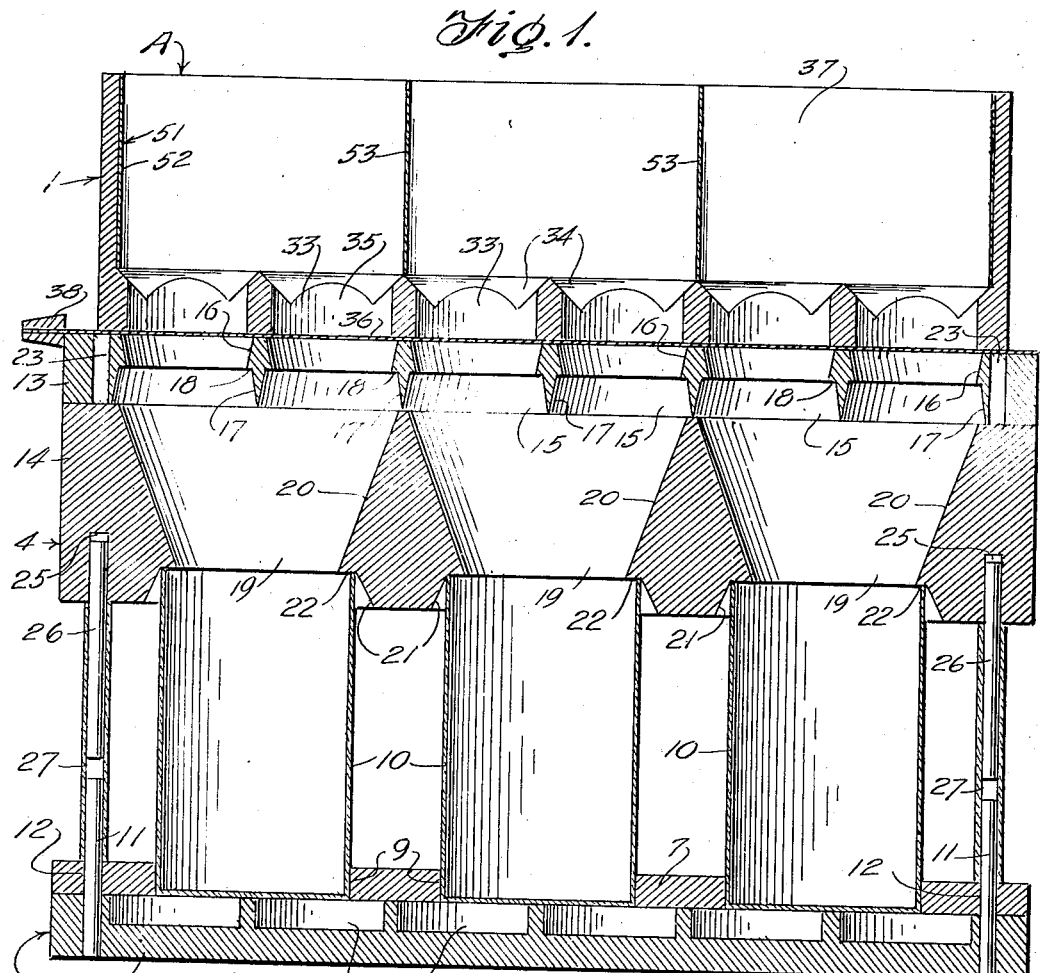
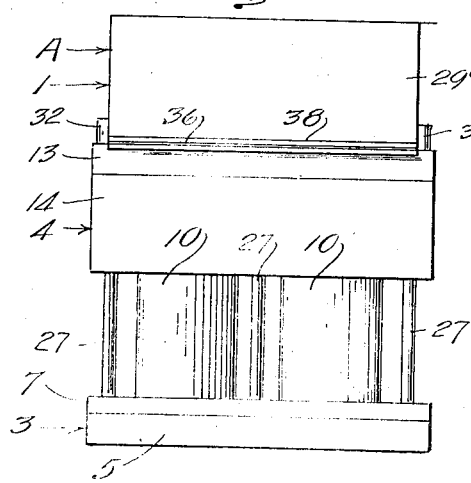
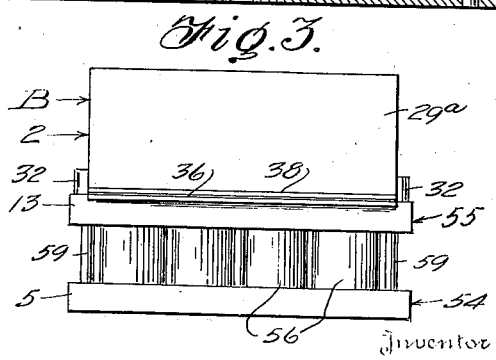
Inventor
DANIEL D. SMITH,
By Kimmel & Crowell
Attorneys.

April 18, 1939.   D. D. SMITH   2,155,336
FILLING MACHINE
Filed April 4, 1938   5 Sheets-Sheet 2
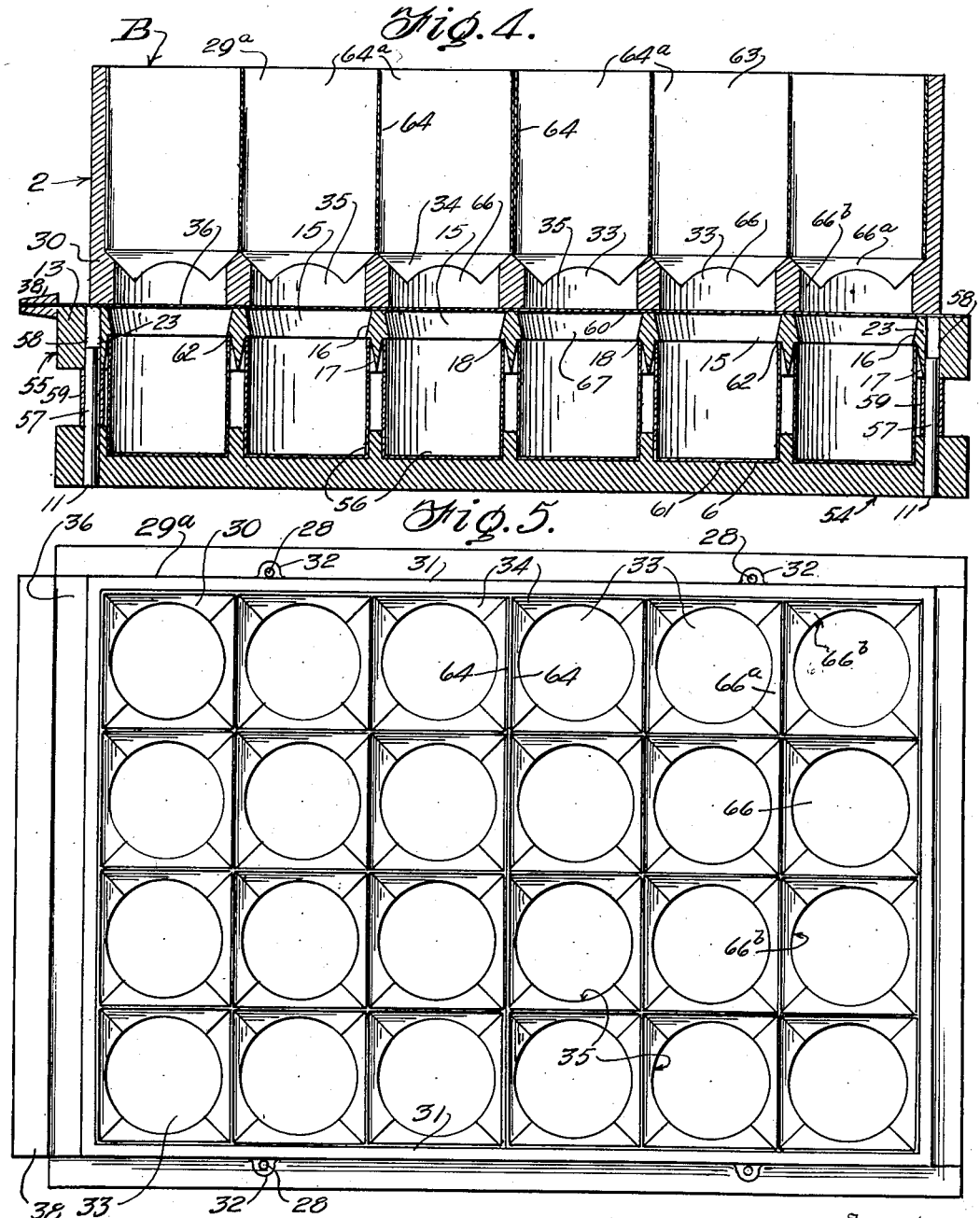
Inventor
DANIEL D. SMITH,
By Kimmel & Crowell,
Attorneys.

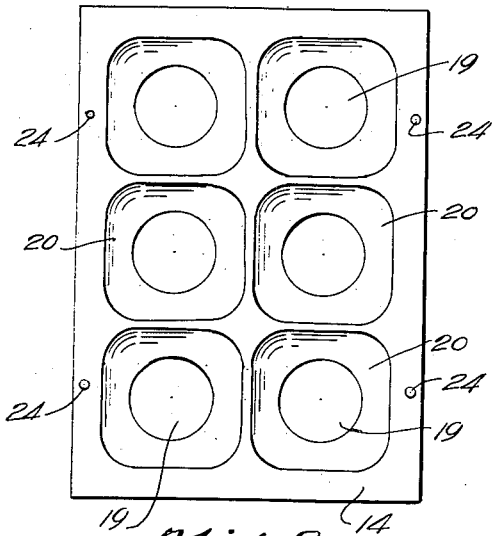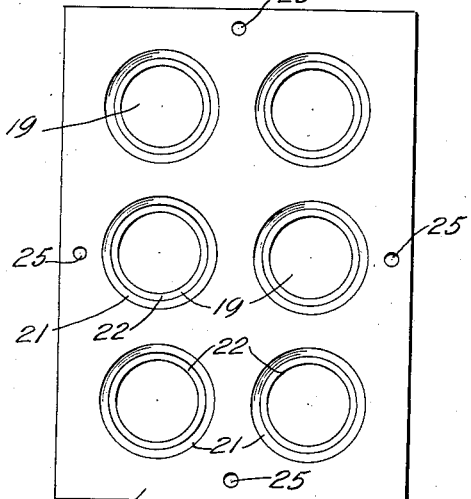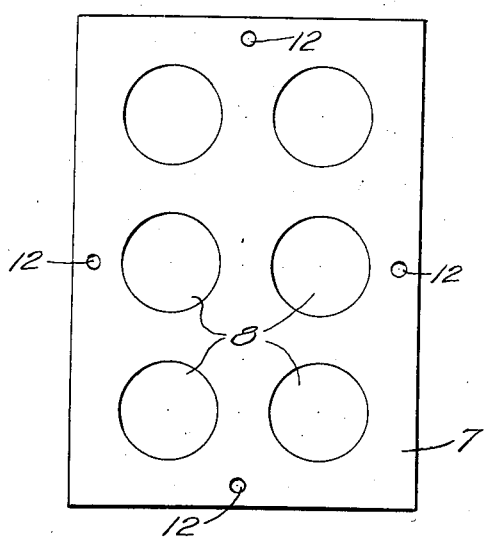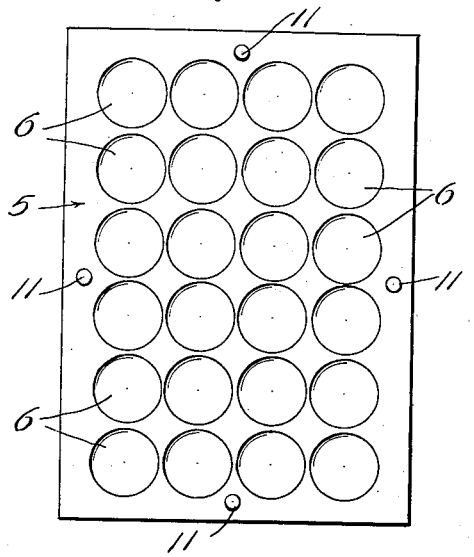

April 18, 1939.  D. D. SMITH  2,155,336
FILLING MACHINE
Filed April 4, 1938  5 Sheets—Sheet 4

Inventor
DANIEL D. SMITH,
By Kimmel & Crowell
Attorneys

April 18, 1939.  D. D. SMITH  2,155,336
FILLING MACHINE
Filed April 4, 1938   5 Sheets-Sheet 5

Inventor
DANIEL D. SMITH,

By Kimmel & Crowell.
Attorneys

Patented Apr. 18, 1939

2,155,336

UNITED STATES PATENT OFFICE 2,155,336

FILLING MACHINE

Daniel Darley Smith, Valdosta, Ga.

Application April 4, 1938, Serial No. 199,995

5 Claims. (Cl. 226—105)

This invention relates to an apparatus for filling cartons, cans and other receptacles and has for its object to provide, in a manner as hereinafter set forth an apparatus of the class referred to for expeditiously filling a number of cans, cartons or other receptacles with discrete material in like measured quantities.

A further object of the invention is to provide, in a manner as hereinafter set forth, an apparatus of the class referred to capable of being used for filling cans, cartons and other receptacles of different capacities with discrete material.

A further object of the invention is to provide, in a manner as hereinafter set forth, an apparatus of the class referred to including a gage structure for levelling a predetermined quantity of a given material whereby when the apparatus is operated the receptacles will receive a like measured amount of such material.

Further objects of the invention are to provide, in a manner as hereinafter set forth, an apparatus for the purpose referred to which is comparatively simple in its construction, strong, durable, compact, thoroughly efficient in its use, expeditious in its action, readily assembled and formed of a series of detachably connected conveniently separated superposed structures.

Embodying the objects aforesaid and to others which may hereinafter appear, the invention consists of the novel construction, combination and arrangement of parts, as will be more specifically described and illustrated in the accompanying drawings, wherein is shown embodiments of the invention, but it is to be understood that changes, variations and modifications may be resorted to which fall within the scope of the invention as claimed.

One embodiment of the invention is shown by way of example of a size and construction for filling six large open top cartons of cylindrical form, but it is to be understood that such embodiment may be of a size to be used in connection with a greater number of large cartons. Another embodiment of the invention is shown by way of example of a size and construction for filling twenty-four small open top cartons of cylindrical form, but it is to be understood that it may be of a size to be used in connection with a greater or smaller number of small cartons.

Preferably the apparatus will be constructed in a manner for use for filling open top cans, cartons and other receptacles of cylindrical form, but it is to be understood that the apparatus may be formed in a manner to be used for the filling of open top cans, cartons or other receptacles of a contour other than cylindrical. The term open top carton is to be considered generic to open top cans or other open receptacles.

In the drawings:

Figure 1 is a longitudinal sectional view of the apparatus,

Figure 2 is an end view thereof,

Figure 3 is an end view of a modified form,

Figure 10:
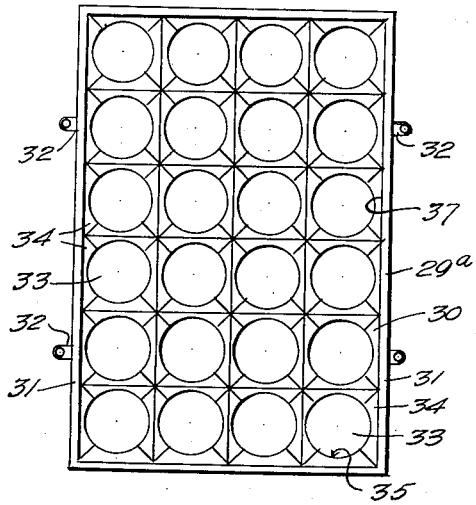
Figure 11:
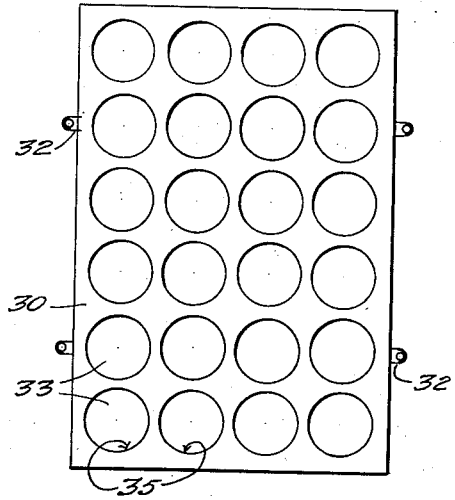
Figure 12:
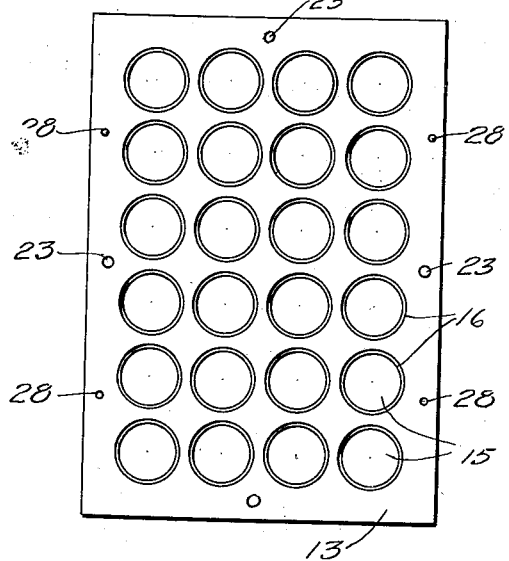
Figure 13:
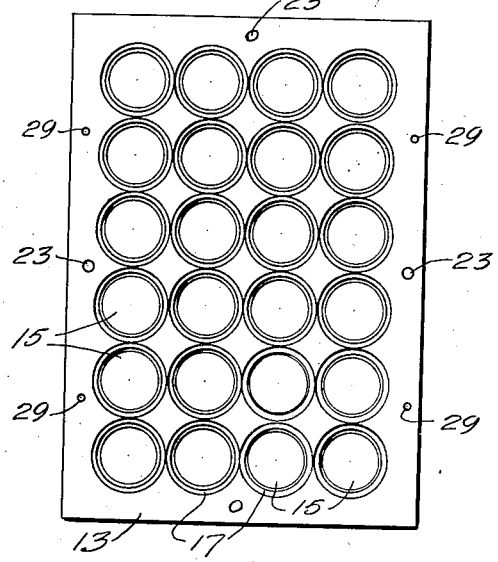
Figure 14:
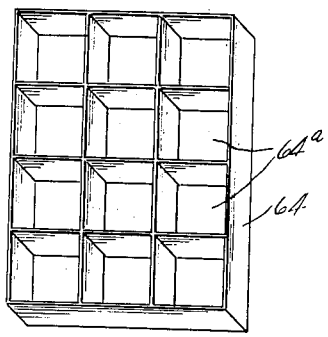
Figure 15:
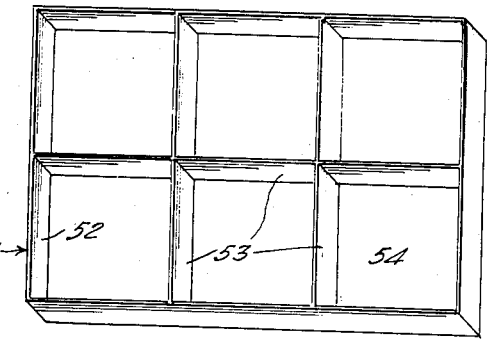
Figure 16:
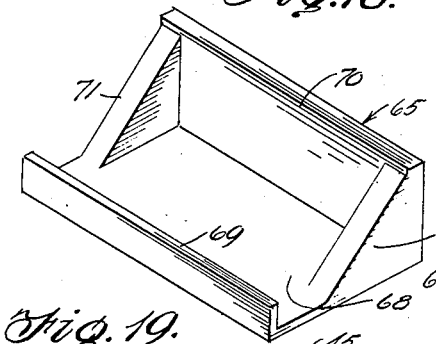
Figure 17:
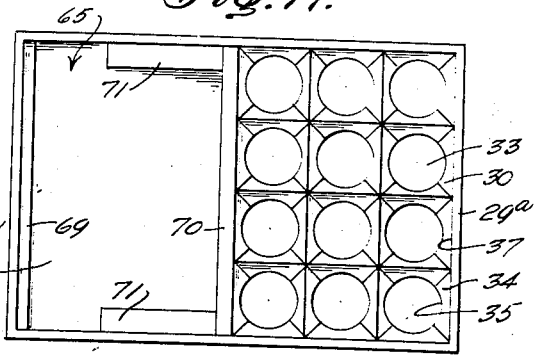
Figure 19:
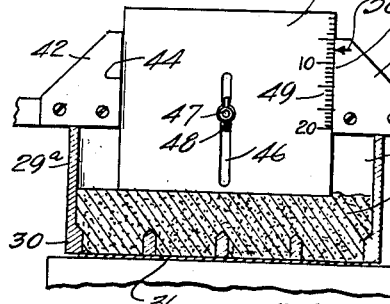
Figure 20:
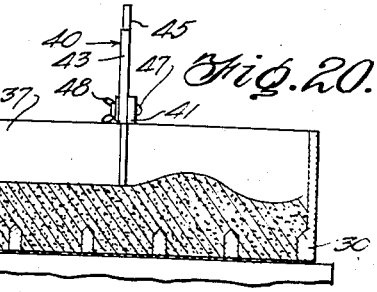
Figure 18:
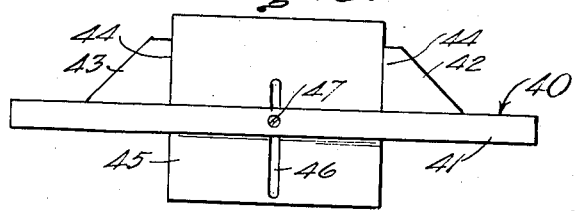

Figure 4 is a longitudinal sectional view of the modified form shown by Figure 3, Figure 5 is a top plan view of the structure shown by Figure 4, Figure 6 is a top plan view of the lower section of the combined material directing and carton positioning structure of the form of the apparatus shown by Figure 1, Figure 7 is a bottom plan of the structure shown in Figure 6, Figure 8 is a top plan view of the upper section of the base structure of the form of the apparatus shown by Figure 1, Figure 9 is a top plan view of the lower section of the base structure of the form of the apparatus shown by Figure 1, Figure 10 is a top plan view of the upper section of the combined material holding and feeding structure which is common to both forms, Figure 11 is a bottom plan view of the structure shown by Figure 10, Figure 12 is a top plan view of the upper section of the material directing and carton positioning structure of the form shown by Figure 1, Figure 13 is a bottom plan of the structure shown by Figure 12, Figure 14 is a perspective view of the form of separator element used in connection with the form shown by Figures 3 and 4, Figure 15 is a view similar to Figure 14 of the form of separator element used in connection with the form shown in Figure 1, Figure 16 is a perspective view of the holder element employed in the form shown by Figures 3 and 4, Figure 17 is a top plan view showing the application of the holder element, Figure 18 is a side elevation of the combined gage and leveling element, and, Figures 19 and 20 are fragmentary views respectively in transverse and longitudinal sections of the apparatus illustrating the application to the material of the element shown in Figure 18.

Each form of the apparatus, as shown includes a base structure, a combined material directing and carton positioning structure arranged in superposed relation to and detachably connected to the base structure, a combined material holding and feeding structure arranged in superimposed relation to and detachably connected to the directing and positioning structure, a material separating means for removably arranging in the holding and feeding structure, and a combined gage and material leveling element for levelling the material in the holding and feeding structure prior to the separating of the material.

The combined material holding and feeding structure employed in each of the forms of the apparatus is similar in construction and the one forming a part of the apparatus A shown by Figure 1 is generally indicated at 1 and the one forming a part of the apparatus B shown by Figure 4 is generally indicated at 2. The combined gage and material levelling element employed in both forms of the apparatus is similar in construction only one is shown and is generally indicated at 40 (Figure 18).

With reference to the apparatus indicated at A the base structure and the combined material and carton positioning structure are generally indicated at 3, 4 respectively.

The base structure 3 includes a bottom section 5 having its upper face formed with a set of sockets 6 (Figure 9) by way of example twenty-four in number. The structure 3 also includes a top section 7 formed with a series of spaced aligned openings 8 (Figure 6), by way of example six in number and of greater diameter than the sockets 6. The section 7 is arranged in superimposed relation with respect to the section 5. The portions of the upper face of the latter between the sockets 6, in connection with the openings 8 provide sockets 9 (Figure 1) for removably receiving the closed lower end portions of the large cartons 10. The upper ends of the cartons 10 are open. The section 5 has anchored thereto upstanding pins 11 which extend through and project above openings 12 formed in the section 7 adjacent the edges of the latter. The pins 11 detachably connect said section 7 to section 5 with the edges of said sections aligned. The base structure 3 acts to support the cartons 10 in an upstanding position.

The combined material directing and carton positioning structure 4 is formed of upper and lower sections 13, 14, respectively of rectangular contour, arranged in superimposed relation and having their edges flush. The section 12 is formed with a series of spaced aligned openings 15 and by way of example, the number of the openings is twenty-four. Each opening 15 has a flared upper portion 16 and a tapered lower portion 17. The upper end of the latter is of greater diameter than the lower end of portion 16 whereby at the junction of such portions an annular shoulder 18 is formed. The portion 16 of opening 15 is of less heighth than the portion 17 of such opening. The portion 16 gradually increases in diameter upwardly. The portion 17 gradually increases in diameter downwardly. The diameter of the upper end of the portion 16 is less than the diameter of the lower end of the portion 17. The section 14 is provided with a series of aligned spaced openings 19 as shown by way of example, six in number. Each opening 19 is formed with a flared upper portion 20 and a tapered lower portion 21. The portion 20 is of materially greater heighth than the portion 21. The lower end of the portion 20 is of less area than the upper end of the portion 21 whereby at the junction of said portion an annular shoulder 22 is provided. The area at the upper end of the portion 20 is greater than the area of the lower end of the portion 21. The portion 21 of an opening 19 provides a positioning means for a carton 10 and when the latter is positioned its top edge abuts against the shoulder 22. The diameter of the upper end of the carton is greater than the diameter of the lower end of the portion 20 of the opening 19. The portion 20 of each opening 19 is of substantially square contour in plan and has rounded corners. The portion 21 of each opening 19 is of circular contour. The section 13 is formed with openings 23 for a purpose to be referred to. The section 14 is provided adjacent its edges with sockets 25 opening at its lower face. Extending into the sockets 25 are connector pins 26 carried by the tubular spacers 27 which are mounted on the section 7 of base structure 3 and encompass the pins 11 which are carried by base section 5 and extend through base section 7. The spacers 26 about the said sections 7 and 14. The pins 11 and sockets 25 in connection with the spacers 27 removably connect structure 4 to structure 3 in superposed spaced relation. The top of section 13 adjacent each of its side edges is formed with an upstanding pair of spaced retaining pins 28 for a purpose to be referred to. The area of the upper end of the portion 20 of each opening 19 is such whereby the portions 17 of four of the openings 15 will communicate therewith. The lower face of the section 13, adjacent each side edge is formed with sockets 29 for receiving the pins 24 on section 14.

The structure 1 includes a rectangular bin or container having an open top body part 29ª and an apertured bottom part 30 into which merges the lower end of the body part 29ª. At the lower end of each side 31 of body part 29ª it has extending outwardly therefrom a pair of spaced eyes or loops 32 (Figure 10). The bottom part 30 is formed with spaced aligned circular openings 33, as shown by way of example, twenty-four in number. Each opening 33 consists of a flared upper portion 34 (Figure 5) of square contour in plan and a circular lower portion 35 of a diameter less than the area of the upper end of the portion 34. The structure 1 also includes a slidable removable gate 36 which normally closes the lower ends of the openings 33. The lower ends of the latter are of less diameter than the upper ends of the portions 16 of the openings 15.

When apparatus A is assembled for use, it will be as shown in Figure 1, that is to say, the cartons 10 mounted in the structure 3 and extended into the bottom of the structure 4. The structures 1 and 4 disposed in superposed relation with the pins 28 on section 13 of structure 4 extended upwardly through the eyes or loops 32 whereby the structure 1 will be held in the desired position relative to structure 4, and with the lower ends of the openings 33 of structure 1 aligning in coaxial relation with respect to the upper end of the openings 15. The gate 36 will be interposed between structures 1 and 4 to an extent to completely close communication between the openings 33 and the openings 15. After the structures 1, 3, 4 and gate 36 have been arranged in the manner as stated, a predetermined amount by weight of a given discrete material is then supplied to the chamber 37 provided by the structure 1. The gate 36 is formed with a handle means 38 to facilitate its entry to between and its removal from between the structures 1 and 4.

After the material has been supplied to the chamber 37 it is levelled off and for such purpose a combined gage and levelling element 40 (Figure 18) is used. The element 40 consists of an oblong bar 41 of the desired length disposed on its lower lengthwise edge. The bar 41 constitutes a handle member and when levelling the material rides on and extends laterally from the top edges of the sides of the body part 29ᵃ of the structure 1. Secured to one face of the bar 41 is a pair of spaced parallel upstanding aligned guides 42, 43 having straight inner edges 44 coacting with the bar 41 to form a guide passage in which is arranged a vertically adjustable discrete material leveller 45 of a length to extend above and to depend from the bar 41. The leveller 45, at its center is formed lengthwise thereof with a slot 46 which extends above and depends below the transverse median thereof. The slot 46 has that portion below said transverse median of greater length than the portion thereof above said median. Extending through bar 41 and slot 46 is a bolt 47 carrying a clamping nut 48 of the wing type. The slot 46, bolt 47 and nut 48 coact for detachably securing the leveller 45 in its adjusted position. The adjustability of the element 40 is provided for to enable the use of such element with discrete materials of different specific gravities, by way of example powdered calcined magnesia, barium sulphate, lead oxide or other materials of different specific gravities which are to be supplied to the cartons 10. The leveller 45 has one face provided with a suitable indicia 49 constituting adjustment indicating means therefor. The guide 43 is provided with a pointer 50 for association with the indicia 49.

After the discrete material has been levelled off, the element 40 is removed and such material is separated into equal portions. The said portions will correspond in number to the number of cartons to be filled, as shown with respect to apparatus A six large cartons are to be filled with like equal portions of the material. For the purpose of dividing the material supplied to chamber 37 into six like equal portions a separator element 51 (Figure 15) is employed and which consists of a rectangular frame 52 of a size to snugly engage the inner faces of the side and end walls of the compartment 37. The frame 52 is of a height to extend from the upper face of the bottom part 30 to the upper edges of the body part 29ᵃ of structure 1. Arranged within and corresponding in height to the frame 1 are oppositely extending partitions 53, disposed in such relation with respect to each other and to the frame 52, to form element 1 into six divisions 54 of like area, and with each division communicating with four openings 33. The partitions 53 are suitably secured together and to the frame 52. After element 51 has been arranged in the manner as stated, in the chamber 37, the gate 36 is removed and each separated portion of the material will flow by gravity through structure 4 into the cartons 10 and fill the latter.

With reference to the form of apparatus indicated at B, the combined material receiving and feeding structure 2 corresponds in structural arrangement to the structure 1 of the apparatus A. The base structure of the apparatus B and indicated at 54 corresponds in form to the lower section 5 of the base structure 3 of the apparatus A. The combined material directing and carton positioning structure 55 of apparatus B corresponds in form to the upper section 13 of the combined material directing and carton positioning structure of the apparatus A.

When the apparatus B is set up for the purpose of filling the cartons 56, the structure 55 is arranged in superposed relation relative to structure 54, and when so arranged the pins 57 of structure 54 extend into the openings 58 in structure 55 which corresponds to the openings 23 in section 13 of structure 4 of apparatus A. By this arrangement section 14 may be used as structure 55 of apparatus B or structure 55 of apparatus B may be employed as the upper section 13 of the structure 4 of apparatus A. This statement also applies to section 5 of structure 3 of apparatus A and structure 54 of apparatus B, as the said section 5 may be employed as the base structure 54 of apparatus B or the base structure 54 may be used as the lower section 5 of the base structure 3 of apparatus A. When structure 55 is arranged over structure 54 tubular spacers 59 are positioned between said structures and encompass the pins 57. When apparatus B is set up for the purpose of filling the cartons 56, the structures 2 and 55 are set up in the same relation as the structures 1 and 4 of the apparatus A. The gate of structure 2 of apparatus B is designated 60.

The apparatus B is employed for filling twenty-four or twelve cartons, such cartons have their closed lower end portions seated in the sockets 61 of the base structure 54, and the edges of their open upper ends bearing against the shoulders 62 formed in the structure 55. The sockets 61 correspond to the sockets 6 formed in the lower section 5 of the base structure 3 of apparatus A. The shoulders 62 correspond to the shoulders 18 formed in the upper section 13 of the structure 4 of the apparatus A.

The structure 2 provides a chamber 63 for receiving the discrete material and which corresponds to the chamber 37 of the structure 1 of apparatus A. The apparatus B includes a pair of material separator elements 64 of like form and which are used when such apparatus is employed to fill twenty-four cartons. The apparatus B may be employed for filling twelve cartons 56, and when used for such purpose but one element 64 is employed and which is to have associated therewith a holder element 65.

Each of the elements 64 is similar in construction to the element 51 of apparatus A, with this exception that each element 64 is formed with twelve divisions 64ᵃ in lieu of six as element 51 is provided with. Each division of an element 54 is to communicate with but one of the openings 66 in the structure 2. The openings 66 correspond to the openings 33 of the structure 1 of apparatus A. The tapered upper portion of each opening 66 is indicated at 66ᵃ and the circular lower portion of the opening at 66ᵇ (Figures 4 and 5). In connection with the apparatus B, each opening 67 in the structure 55 discharges the material directly into the open top of a carton 56. Each element 64 is of a size corresponding to one-half of the area of the chamber 63. When both of the elements 64 are employed they are disposed in abutting relation with each other and with the walls of the chamber 63 (Figures 4 and 5).

The holder element 65 is of a size corresponding to one-half of the area of the chamber 63. The element 65 is of rectangular contour in plan and it consists of a flat bottom 68 formed with a vertical flange 69 at one side, a vertical side wall 70 at its other side, and a pair of upstanding substantially triangular shaped end pieces 71 merging into the inner face of wall 70.

When apparatus B is employed for filling twelve cartons 56, these latter are mounted at their lower ends into three parallel rows of sockets 61 at the left or at the right of base structure 54, by way of example the said three rows of sockets are shown at the left of structure 54 in Figure 17. The element 64 which is used is mounted in chamber 63, and abuts half of the side walls and one end wall of such chamber. The element 65 is to be arranged in chamber 63 and abuts the other half of the side walls and the other end wall of chamber 63. The element 65 is of a size to frictionally engage with one of the end walls and half portions of the side walls of chamber 63. The element 65 is to be positioned in chamber 63 before the discrete material is supplied to structure 2. A combined gage and levelling element 40 is to form a part of apparatus B. After element 65 has been positioned in chamber 63 to blank off one-half of the latter, the discrete material is supplied to the non-blanked off, but closed portion of the chamber 63. The non-blank off portion of chamber 63 is closed at its bottom by the gate 60 which corresponds to gate 36. The discrete material is then levelled off by element 40, the latter then removed and one of the elements 64 positioned in structure 2 for separating the material into equal portions. The gate 60 is then opened to an extent to permit the material discharging from structure 2, through structure 55 into the cartons 56.

When the twenty-four cartons 56 are to be filled, the holder element 65 is not used, but in lieu thereof both elements 64 are employed as shown in Figures 4 and 5.

With reference to Figure 19, the discrete material 74 is shown as having been levelled off by the element 40, whereas in Figure 20 the material 74 is shown as in a state to be levelled off by element 40.

With reference to each form of apparatus, after the cartons have been filled, the combined material receiving and feeding structure is removed from the combined material directing and carton positioning structure and the latter is then lifted from the filled cartons. The filled cartons are removed from the base structure. Empty cartons are then mounted in the base structure and the other structure of the apparatus are then arranged as shown in Figure 1 or Figure 4. If desired the structures positioned above the base structure may be lifted off together from the filled cartons.

When the cartons 10 have their upper open ends extended into the structure, the shoulders 22 extend inwardly from the top edges of the carton and this statement applies to the shoulders 62 of the structure 55 with respect to the top edges of the cartons 56.

The openings in each of the combined material directing and carton positioning structures will be termed passages in the claims.

What I claim is:

1. In a filling apparatus for cartons having open tops and closed bottoms, a combined material receiving and feeding structure formed with a bottom provided with a series of openings for feeding the material therefrom and removable means for normally closing said openings, a stationary base structure provided with sockets for removably receiving the closed lower ends of and for sustaining the cartons to be filled in an upstanding position, a combined material directing and carton positioning structure formed with material directing passages for aligning with said openings and for communication with the cartons, the walls of said passages, intermediate their ends, being provided with annular flat shoulders for seating directly on the edges at the open tops of the cartons, said combined material directing and carton positioning structure for interposing between the other of said structures, means for positioning in the receiving and feeding structure for separating the material into equal portions, each portion for delivery to a carton, and means for removably connecting said structures in superposed relation.

2. The invention as set forth in claim 1 having each of the openings in the bottom of the material receiving and feeding structure formed with a flared upper portion and a lower portion of uniform diameter, the openings in said bottom, when said closure means is removed communicating with the passages in the material directing and certain positioning structure when said structures are disposed in superposed relation.

3. The invention as set forth in claim 1 having each of the openings in the bottom of the material receiving and feeding structure formed with a flared upper portion and a lower portion of uniform diameter, each of the passages in the said combined material directing and carton positioning structure having a flared upper portion and a tapered lower portion and with such portions of said passages separated by said annular shoulders, the openings in said bottom, when said closure means is removed communicating with the flared portions of said passages when said structures are disposed in superposed relation.

4. In a filling apparatus for cartons having open tops and closed bottoms, a combined material receiving and feeding structure providing an open top chamber having a bottom formed with a series of openings for feeding the material therefrom and removable means for normally closing said openings, said openings having flared upper portions, a stationary base structure provided with sockets for removably receiving the closed lower ends and for sustaining the cartons to be filled in an upstanding position, a combined material directing and positioning structure for the cartons for interposing between the said other structures and formed with material directing passages aligned with said openings and for communicating with the cartons, the walls of said passages being formed respectively with tapered lower portions for receiving the upper terminal portions of the cartons and flat annular shoulders at the upper ends of said tapered portions for overlapping and seating directly on the edges at the open top of the cartons, means for positioning in said chamber for dividing the material thereon in separate quantities, and means for detachably connecting said structures in superposed relation.

5. In a filling apparatus for cartons having open tops and closed bottoms, a combined material receiving and feeding structure providing an open top chamber having a bottom formed with a series of openings for feeding the material therefrom and removable means for normally closing said openings, said openings having flared upper portions, a stationary base structure provided with sockets for removably receiving the closed lower ends and for sustaining the cartons to be filled in an upstanding position, a combined material directing and positioning structure for the cartons for interposing between the said other structures and formed with material directing passages aligned with said openings and for communicating with the cartons, the walls of said passages being formed respectively with tapered lower portions for receiving the upper terminal portions of the cartons and flat annular shoulders at the upper ends of said tapered portions for overlapping and seating directly on the edges at the open top of the cartons, means for positioning in said chamber for dividing the material thereon in separate quantities, means for detachably connecting said structures in superposed relation, and the tapered lower portions of the said passages being of greater diameter throughout than the diameter of the cartons.

DANIEL D. SMITH.